United States Patent Office 3,155,690
Patented Nov. 3, 1964

3,155,690
N-SUBSTITUTED 17α-AMINOSTEROIDS
John Wayne Cole, Deerfield, Ill., assignor to Abbott Laboratories, North Chicago, Ill., a corporation of Illinois
No Drawing. Filed Aug. 17, 1962, Ser. No. 217,537
7 Claims. (Cl. 260—397.3)

The present invention is concerned with 17α-aminosteroids of the androstene series and their process of manufacture.

The new compounds have the formula

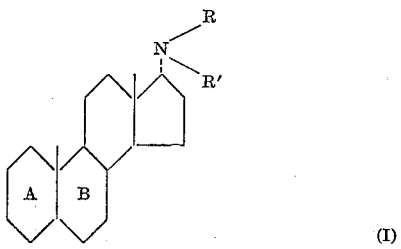

wherein R is hydrogen or lower alkyl, and wherein R' is hydrogen or acyl, and wherein the A and B rings have the partial structures

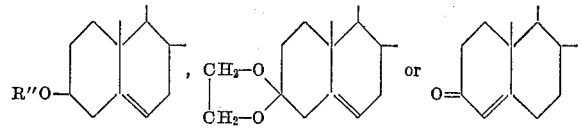

wherein R'' is hydrogen or acyl.

The present invention also is concerned with steroid intermediates useful in the manufacture of the above 17α-aminosteroids. These intermediates have the formula

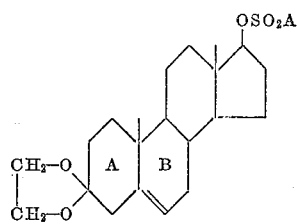

wherein A is alkyl, aryl or alkylaryl.

The new 17α-aminosteroids of Formula I are made by reacting a steroid-17β-ol sulfonic ester with excess ammonia or excess alkylamine at a temperature between 125° and 165° C. for a period between 1 hour and 48 hours. Since this reaction temperature may exceed the critical temperature of ammonia, it may be necessary to use pressure equipment capable of retaining the ammonia vapor. These reaction conditions yield a 17α-aminosteroid, which may be separated and used in the form of the free amine, in the form of salts of the amine with acids such as acetic acid or hydrochloric acid, or may be used in the form of an acyl derivative. The 17α-acylaminosteroids are made from the above 17α-aminosteroids by treatment with a known acylating agent.

The new 17α-aminosteroids are anti-androgenic and can be used to regulate hyper-androgenic effects in warm-blooded animals.

The following examples are given below as illustrations for the methods producing the new steroids and steroid intermediates and are not meant to limit the invention in any respect.

EXAMPLE 1

Testosterone p-Toluenesulfonate

A mixture of 3.88 grams of testosterone, 17 ml. of anhydrous pyridine and 3.9 grams of p-toluenesulfonyl chloride is stirred for 10 minutes and then left at room temperature for about 20 hours. Portion-wise addition of about 40 ml. of water causes hydrolysis of the excess acid chloride, and testosterone p-toluenesulfonate crystallizes. The compound is filtered, washed, and dried, producing crystals in a yield of 4.07 grams. Recrystallization from acetone/hexane gives prisms melting at 171–172° C. of which the carbon-hydrogen analysis is in agreement with the compound of the empirical formula $C_{26}H_{34}O_4S$ and which has an infrared spectrum as expected for testosterone p-toluenesulfonate.

EXAMPLE 2

3-Ethylenedioxyandrost-5-En-17β-Ol p-Toluenesulfonate (a) A mixture of 3.5 grams of testosterone p-toluenesulfonate, 5.5 ml. of ethylene glycol, 120 ml. of benzene and 0.07 gram of p-toluenesulfonic acid is stirred and refluxed for 5 hours, using a trap for the volatilized water. The residual benzene solution is cooled, washed with dilute sodium hydroxide and with water, and then concentrated. The solid residue is crystallized from about 35 ml. of methanol. The crystalline product is recrystallized from methylene chloride/methanol to obtain 2.8 grams of 3-ethylenedioxyandrost-5-en-17β-ol p-toluenesulfonate melting at 170–174° C. in a yield of 2.8 grams. Upon recrystallization of this material, pure 3-ethylenedioxyandrost-5-en-17β-ol p-toluenesulfonate is obtained in colorless prisms melting at 181–182° C. which have a satisfactory infrared absorption spectrum. The analytical values correspond to those calculated for the compound $C_{28}H_{38}O_5S$.

(b) The above compound is also prepared by stirring at room temperature for 26 hours a mixture of 2 grams of 3-ethylenedioxyandrost-5-en-17β-ol (described in U.S. 2,302,636), 8 ml. of pyridine and 2.5 grams of p-toluenesulfonyl chloride, followed by portion-wise addition of 55 ml. of water to crystallize 3-ethylenedioxyandrost-5-end-17β-ol p-toluenesulfonate.

EXAMPLE 3

3-Ethylenedioxyandrost-5-En-17β-Ol Methanesulfonate

By replacing the p-toluenesulfonyl chloride of Example 2(b) with 2.0 grams of methanesulfonyl chloride, and with otherwise identical reaction conditions, 3-ethylenedioxyandrost-5-en-17β-ol methanesulfonate is obtained in amorphous form. Its empirical formula is $C_{22}H_{34}O_5S$.

Replacing the above methanesulfonyl chloride with benzenesulfonyl chloride produces 3-ethylenedioxyandrost-5-en-17β-ol benzenesulfonate.

EXAMPLE 4

3β-Acetoxyandrost-5-En-17β-Ol p-Toluenesulfonate

A mixture of 19 grams of 3β-acetoxyandrost-5-en-17β-ol, 75 ml. of pyridine and 19 grams of p-toluenesulfonyl chloride is stirred until a clear solution is formed. After leaving the mixture standing at room temperature for 20 hours, water is added and the mixture is extracted with ether. The ether solution is concentrated, whereby a crystalline, neutral product is obtained. Recrystallization from acetone gives 3β-acetoxyandrost-5-en-17β-ol p-toluenesulfonate melting at 162–164° C., the analysis of which is in agreement with the calculated values for $C_{28}H_{38}O_5S$.

EXAMPLE 5

*Androst-5-Ene-3β,17β-Diol 17-p-Toluenesulfonate*

The 3β-acetoxyandrost-5-en-17β-ol p-toluenesulfonate of Example 4 is dissolved in a mixture of methanol and benzene (5:1) and this solution is refluxed with an equimolar quantity of 2 N sodium hydroxide for 3 hours, followed by the addition of water. The mixture is heated on the steam bath until all of the benzene and part of the methanol are distilled. The crystals which separate from the residue on cooling are washed with 50% aqueous methanol and dried. This crude material, melting at 126–129° C., is recrystallized from methanol to white crystals melting at 130–132° C. which, by chemical analysis and infrared absorption spectrum, is identified as androst-5-ene-3β,17β-diol 17-p-toluenesulfonate of empirical formula $C_{26}H_{36}O_4S$.

EXAMPLE 6

*Androst-5-Ene-3β,17β-Diol 17-Methanesulfonate*

When p-toluenesulfonyl chloride of Example 4 is replaced with methanesulfonyl chloride, the procedure outlined in Examples 4 and 5 yields androst-5-ene-3β,17β-diol 17-methanesulfonate.

EXAMPLE 7

*17α-Aminoandrost-5-En-3β-Ol*

(a) A mixture of 0.98 gram of androst-5-ene-3β,17β-diol 17-p-toluenesulfonate and 25 ml. of liquid ammonia is heated in a closed, glass-lined, steel cylinder at 140–145° C. for 18 hours. After cooling, the excess ammonia is released and the residue is stirred with water and ether. The aqueous phase containing the amine salt is separated.

The ether phase is washed with dilute sulfuric acid to extract some amine sulfate, and this wash liquor is combined with the above water phase. The combined aqueous solutions are washed with ether and are made alkaline with 2 N sodium hydroxide. This solution is extracted with ether and the ether is then evaporated, leaving white crystals of 17α-aminoandrost-5-en-3β-ol melting at 193–195° C. Chemical analysis shows 78.84% C and 10.70% H, which is in agreement with the calculated values for $C_{19}H_{31}NO$.

(b) By replacing androst-5-ene-3β,17β-diol 17-p-toluenesulfonate above with androst-5-ene-3β,17β-diol 17-methanesulfonate, the same 17α-aminoandrost-5-en-3β-ol is obtained, melting at 193–196° C.

The above 17α-aminoandrost-5-en-3β-ol [M.P. 193–195°; [α]$_D$ —93° (in chloroform)] was tested in various ways which served to prove that it was a different substance than the corresponding 17β-aminoandrost-5-en-3β-ol [M.P. 166°; [α]$_D$ —80° (in chloroform)].

EXAMPLE 8

*3β-Acetoxy-17α-Acetamidoandrost-5-Ene*

Four grams of acetic anhydride is added to a solution of 200 mg. of 17α-aminoandrost-5-en-3β-ol in 5 ml. of pyridine and the mixture is warmed to 70° for a short period. After leaving the mixture at room temperature for 18 hours, it is diluted with 2 ml. of water and the mixture is concentrated in vacuo to a waxy residue. This residue is dissolved in anhydrous ether and purified by passing it through silica gel. Evaporation of the ether and recrystallization of the residue from methanol gives white crystals melting at 112° C. which re-solidify and re-melt at 161° C. A vacuum-dried sample melts at 161–161.5° C. and gives a chemical analysis corresponding with the calculated values for 3β-acetoxy-17α-acetamidoandrost-5-ene of empirical formula $C_{23}H_{35}NO_3$.

Vapor-phase chromatography by the method shown by Sweeley and Horning C Nature, vol. 187, p. 144–5, in 1960) of the above diacetyl compound shows a retention time of 14.3±0.05 minutes. The retention time for the corresponding 17β-acetamido compound under the same conditions is 15.35±0.05 minutes, and the retention time for reference progesterone is 8.20 minutes.

EXAMPLE 9

*17α-Acetamidoandrost-5-En-3β-Ol*

The diacetyl compound of Example 8 is hydrolyzed by refluxing it for 40 minutes in 0.1 N sodium hydroxide in methanol followed by evaporation of most of the alcohol. By diluting the residue with water, 17α-acetamidoandrost-5-en-3β-ol crystallizes.

EXAMPLE 10

*Other 17α-Acylaminoandrost-5-En-3β-Ols*

17α-aminoandrost-5-en-3β-ol is heated for 90 minutes with 6 molar equivalents of propionic anhydride followed by addition of water which destroys the excess of propionic anhydride. The mixture containing the crude 3β-propionoxy-17-propionamidoandrost-5-ene is neutralized with 2 N sodium hydroxide and is then heated for 30 minutes at the boiling point in methanol containing 0.1 N sodium hydroxide. Upon dilution with water, 17α-propionamidoandrost-5-en-3β-ol precipitates.

The heating step with methanolic sodium hydroxide hydrolyzes the ester group in the 3-position of the intermediate. When this step is omitted, the intermediate 17α-propionamido-3β-propionoxyandrost-5-ene can be isolated by extracting the crude material with ether, washing the ether solution with cold dilute sodium hydroxide followed by water, and then evaporating the ether to leave a residue of the intermediate compound.

By replacing propionic anhydride in the above example with chloroacetic anhydride, 17α-chloroacetamido-3β-chloroacetoxyandrost-5-ene of empirical formula $C_{23}H_{33}Cl_2NO_3$ is obtained, from which 17α-chloroacetamidoandrost-5-en-3β-ol of empirical formula $$C_{21}H_{32}ClNO_2$$

is produced by hydrolysis in methanolic 0.1 N hydrochloric acid solution.

By replacing the above propionic anhydride with caproic anhydride or isocaproic anhydride, 17α-capramido-3β-caproyloxyandrost-5-ene or 17α-isocapramido-3β-isocaproyloxyandrost-5-ene, respectively, of the empirical formula $C_{31}H_{51}NO_3$, are obtained, which upon hydrolysis produce 17α-capramidoandrost-5-en-3β-ol or 17α-isocapramidoandrost-5-en-3β-ol, respectively, of the empirical formula $C_{25}H_{41}NO_2$.

The above mentioned amount of 6 molar equivalents of the respective anhydride is not critical: any excess, preferably between 2 and 20 moles, produces satisfactory results.

EXAMPLE 11

*17α-Amino-3-Ethylenedioxyandrost-5-Ene*

A suspension of 3.2 grams of 3-ethylenedioxyandrost-5-en-17β-ol p-toluenesulfonate in 40 ml. of liquid ammonia is slowly heated in a closed, glass-lined, steel cylinder to 140° C. and kept at 140° C. for 20 hours at autogenous pressure. After this period the cylinder is cooled slowly and the excess ammonia is released. The residue is stirred with benzene and 50% aqueous acetic acid. The aqueous phase is separated and the organic phase is re-extracted with 50% aqueous acetic acid and subsequently with water. The combined aqueous portions are cooled to 10° C. and stirred with fresh ether while ice and 2 N sodium hydroxide is added until the aqueous phase tests alkaline to litmus.

The ether layer contains the desired 17α-amino-3-ethylenedioxyandrost-5-ene. It is isolated by evaporation of the ether to yield an amorphous residue which shows an infrared absorption pattern and chemical analysis in agreement with the expected values for the compound of the formula $C_{21}H_{33}NO_2$.

When the above 3-ethylenedioxyandrost-5-en-17β-ol p-toluenesulfonate is replaced by the corresponding 17β-ol methanesulfonate, the same product is obtained.

EXAMPLE 12

17α-Aminoandrost-4-En-3-One

An ether solution of 0.4 gram of 17α-amino-3-ethylenedioxyandrost-5-ene is made acidic with 6 ml. of acetic acid and 6 ml. of water. This mixture is concentrated on a steam bath until no more solvent distills and is then concentrated in vacuo to a syrup which is allowed to crystallize in vacuo. The brown crystals of the acetic acid salt of 17α-aminoandrost-4-en-3-one are dried by blotting with filter paper and recrystallized from water to give nearly white crystals. Their infrared absorption spectrum is consistent with the assigned structure. The salt is soluble in water and in methanol. Upon heating, it slowly turns dark. The salt has a very bitter taste.

The free amine of the empirical formula $C_{19}H_{29}NO$ is made by shaking the acetate salt with ether and 0.5 N sodium hydroxide, followed by separation of the layers and evaporation of the ether.

The free amine dissolved in ether is shaken with a small amount of 1 N hydrochloric acid and the layers are separated to give a water solution of the hydrochloric acid salt of 17α-aminoandrost-4-en-3-one. The dried salt is extremely bitter and turns dark on standing or upon heating.

EXAMPLE 13

17α-Methylaminoandrost-4-En-3-One (a) A solution of 3.9 grams of 3-ethylenedioxyandrost-5-en-17β-ol p-toluenesulfonate in 40 ml. of methylamine is heated in a glass-lined, steel cylinder at 135–145° C. for 28 hours at autogenous pressure and is then cooled slowly. The resulting clear, pale solution is evaporated to a crystalline residue which is recrystallized from methanol to recover first a small portion of starting material. The filtrate of this crystallization contains the 17α-methylamino-3-ethylenedioxyandrost-5-ene.

From this filtrate, 17α-methylaminoandrost-4-en-3-one is recovered by diluting this solution with 200 ml. of ether, shaking this mixture step-wise with three portions of 1 N hydrochloric acid in order to separate aqueous layers containing the hydrochloric acid salt of the free amine. The combined aqueous layers are washed once with fresh ether to free them of any entrained impurities and then the aqueous solution is concentrated and heated to 70° for 20 minutes to effect hydrolysis of the ethylenedioxy group. The resulting solution is cooled, stirred with fresh ether and 2 N sodium hydroxide. The ether layer is briefly washed with water, concentrated to a crystalline residue, and the solid material is recrystallized from anhydrous ether to yield white crystals of 17α-methylaminoandrost-4-en-3-one melting at 183–185° C. Its infrared absorption spectrum is consistent with the assigned structure and the analysis corresponds with the calculated values for the formula $C_{20}H_{31}NO$. The amine is soluble in methanol, chloroform, dilute hydrochloric acid, and acetic acid. It is slightly soluble in water. Its acetate salt has a bitter taste.

(b) By replacing the 3-ethylenedioxyandrost-5-en-17β-ol p-toluenesulfonate in this example with 3-ethylenedioxyandrost-5-en-17β-ol methanesulfonate, 17α-methylamino-3-ethylenedioxyandrost-5-ene is obtained in the same way.

By replacing the methylamine above with ethylamine or butylamine, 17α-ethylaminoandrost-4-en-3-one or 17α-butylaminoandrost-4-en-3-one, respectively, are obtained under otherwise identical conditions.

EXAMPLE 14

17α-Alkylaminoandrost-5-En-3-Ols

By replacing the 3-ethylenedioxyandrost-5-en-17β-ol p-toluenesulfonate used in Example 13(a) with androst-5-ene-3β,17β-diol 17-p-toluenesulfonate and proceeding under otherwise analogous conditions to those described in Example 13, 17α-methylaminoandrost-5-en-3-ol is obtained, together with a minor amount of unreacted starting material. The free amine is obtained directly without the necessity of the hydrolysis step described in the above example. The new 17α-methylaminoandrost-5-en-3-ol shows an analysis corresponding to the calculated values for $C_{20}H_{33}NO$.

By substituting methylamine used above with propylamine, the corresponding 17α-propylaminoandrost-5-en-3-ol is obtained.

EXAMPLE 15

17α-(N-Methyl-N-Acylamino)Androst-5-En-3β-Ols

By replacing the 17α-aminoandrost-5-en-3β-ol of Example 8 with 17α-methylaminoandrost-5-en-3β-ol and otherwise following the procedure described in Example 8, 17α-(N-methylacetamido)-3β-acetoxyandrost-5-ene of empirical formula $C_{24}H_{37}NO_3$ is obtained, which, upon hydrolysis by the procedure of Example 9, produces 17α-(N-methyl-N-acylamino)androst-5-en-3β-ol of empirical formula $C_{22}H_{35}NO_2$.

When, in the above procedure, propionic anhydride is used as the acylating agent, 17α-(N-methylpropionamido)-3β-propionoxyandrost-5-ene of empirical formula $C_{26}H_{41}NO_3$ is obtained which hydrolyzes to 17α-(N-methylpropionamido)androst-5-en-3β-ol of empirical formula $C_{23}H_{37}NO_2$.

When caproic anhydride is used, the corresponding dicaproyl compound of empirical formula $C_{32}H_{53}NO_3$ is obtained which hydrolyzes to 17α-(N-methylcaproamido)androst-5-en-3β-ol of empirical formula

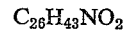

When chloroacetic anhydride is used as the acylating agent, 17α-(N-methylchloroacetamido)-3β-chloroacetoxyandrost-5-ene of empirical formula $C_{24}H_{35}Cl_2NO_3$ is obtained which hydrolyzes to 17α-(N-methylchloroacetamido)androst-5-en-3β-ol of empirical formula

Similarly, when in the above example, 17α-methylaminoandrost-5-en-3β-ol is replaced by other 17α-alkylaminoandrost-4-en-3-ones, reactions with alkyl monocarboxylic acid anhydrides produce the corresponding 17α-(N-alkyl-N-acylamino)androst-5-en-3β-ols.

It is important that in the process leading to 17α-aminosteroids of the present invention, the reaction of the corresponding 17β-sulfonic acid esters with ammonia or alkylamine is carried out at elevated temperature. Surprisingly, this reaction does not take place even slowly at ordinary temperatures. At high temperature the amino-substituent appears then in the α-position. These new 17α-(N-alkyl and/or N-acyl)aminosteroids have never before been synthesized and are not found as by-products in reactions used to prepare the corresponding 17β-aminosteroids. The above described process has to be carried out at a temperature between 125° and 165° C., preferably for a period exceeding one hour.

The reaction leading to the N-acyl derivatives of 17α-aminosteroids have been described above as using the desired carboxylic acid anhydride as the reactant. Obviously, such reactions can be carried out under a variety of similar conditions and also by substituting the carboxylic acid anhydride with the corresponding carboxylic acid chloride. When the latter is used, the reaction mixture has to contain an acid binder of which pyridine is the most commonly used example. Other acid binders such as sodium bicarbonate, triethylamine, etc. can be substituted therefor. When a carboxylic acid anhydride is used as the acylating agent, the use of an acid binder is optional.

Others may practice the invention in any of the numerous ways which will be suggested to one skilled in

I claim:
1. A steroid of the formula

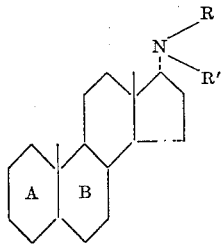

wherein R is selected from the group consisting of hydrogen and loweralkyl, and wherein R' is selected from the group consisting of hydrogen and the group XCO wherein X is selected from the group consisting of loweralkyl and chloroloweralkyl, and wherein the A and B rings have a partial structure selected from the group consisting of

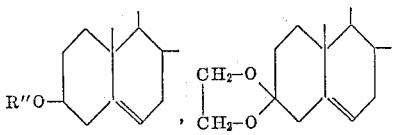

and

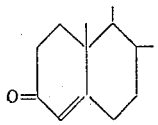

wherein R" is selected from the group consisting of hydrogen and the group XCO wherein X is selected from the group consisting of loweralkyl and chloroloweralkyl.

2. 17α-aminoandrost-5-en-3β-ol.
3. 17α-acetamidoandrost-5-en-3β-ol.
4. 17α-aminoandrost-4-en-3-one.
5. 17α-methylaminoandrost-4-en-3-one.
6. 3β-acetoxy-17α-acetamindoandrost-5-en.
7. The process of reacting a steroid of the formula

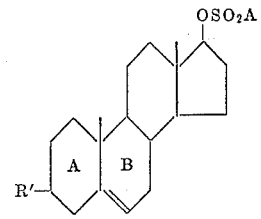

wherein A is selected from the group consisting of alkyl, aryl and alkylaryl, and wherein R' is selected from the group consisting of hydroxy, acetoxy and ethylenedioxy, with an amine of the formula R"NH$_2$ wherein R" is selected from the group consisting of hydrogen and loweralkyl, at a temperature between 125° and 165° C.

References Cited in the file of this patent
UNITED STATES PATENTS

| | | |
|---|---|---|
| 2,561,378 | Julian et al. | July 24, 1951 |
| 2,655,519 | Schmidt-Thome | Oct. 13, 1953 |
| 2,707,189 | Murray | Apr. 26, 1955 |
| 2,763,669 | Dodson et al. | Sept. 18, 1956 |